Patented Oct. 2, 1945

2,385,803

UNITED STATES PATENT OFFICE 2,385,803

PROCESS FOR THE MANUFACTURE OF PLASTIC COMPOSITIONS

Edwin J. Cohn, Cambridge, and John D. Ferry, Woods Hole, Mass., assignors to Research Corporation, New York, N. Y., a corporation of New York No Drawing. Application February 9, 1942, Serial No. 430,076

3 Claims. (Cl. 106—124)

The present invention relates to a novel plastic and to processes for the manufacture thereof. It is the object of the invention to provide improvements in plastic products and processes.

It has been found that protein materials, such as are contained for example in animal fluids and in animal and vegetable extracts, are suitable for use in the production of novel plastics. Proteins contain but few of the unsaturated bonds which are prone to oxidation and consequent deterioration. In addition, since proteins are constituted largely of polar groups, plastics made therefrom are resistant to non-polar solvents such as hydrocarbons.

Various protein components, principally fibrinogen, globulins and albumins, are found in blood. These differ considerably from each other in molecular form and structure, in solubility and in other respects. Fibrinogen, for example, is made up of long chain molecules, while the globulin and albumin molecules are more nearly globular in shape. Perhaps for this reason, fibrinogen forms a coherent structure, well adapted to the manufacture of molded plastics, even when considerable amounts of plasticizer are present. The globulins and albumins, on the other hand, are not by themselves so well adapted to the manufacture of molded plastics. Plastics made from albumin tend to be brittle or, especially if a substantial amount of plasticizer is present, to lack coherence and strength. These latter types of proteins, however, when added to fibrinogen in the manufacture of plastics, impart to the plastic highly desirable properties not possessed by like products containing only fibrinogen.

Fibrinogen plastics tend to be rubbery and flexible. Although this property is desirable in plastics for some uses, it is disadvantageous in other cases. We have found that by mixing albumin or globulin with the fibrinogen, the amount of plasticizer remaining the same, greater rigidity is imparted to the plastic product.

The whole properly dried blood plasma is a mixture of albumins, globulins and fibrinogen, and may be made into a plastic by our methods. The variety of properties obtainable is far greater, however, if the ratio of albumin to globulin and to fibrinogen, as well as the amount and nature of the plasticizer and the conditions of manufacture, are subject to control and to variation. Thus, for certain purposes the albumin may be omitted and for others the globulins. Certain of the globulins are also constituted of rod-shaped proteins and they can be substituted, in part at least, for fibrinogen. Other rod-shaped proteins, such as collagen, could be substituted for the fibrinogen, and other more nearly globular proteins for the albumins, and some of these may be derived from vegetable as well as animal sources. The conditions for making the plastic will differ somewhat, however, if rod-shaped or globular proteins of other natures are substituted.

If a protein poor in hydrophilic but rich in hydrophobic groups, or vice versa, is chosen, the properties of the plastic product, especially its swelling in polar or non-polar solvents, may be modified. This can also be accomplished by chemically modifying the protein by transforming certain of its reactive groups into either polar or non-polar groups.

Proteins for use in the manufacture of our novel plastic may be obtained, for example, from blood, by various methods. One such method is as follows:

The corpuscles are first removed from the blood by centrifugation, clotting of the fibrinogen being prevented by the addition of citrates or like agents. The plasma remaining after the separation of the corpuscles is then treated for the precipitation therefrom of fibrinogen by cooling it to 0° C. or lower and adding an alcohol, such as ethanol, in amount sufficient to constitute 10% by volume of the plasma. The hydrogen ion concentration and the ionic strength of the plasma are also preferably adjusted. The pH of the solution may be controlled by the addition of acids or alkalis and the ionic strength by the addition of a salt, for example sodium chloride, ammonium sulfate, sodium sulfate, sodium, ammonius or potassium phosphate, acetate, carbonate or the like. Phosphates, acetates, carbonates, borates, or citrates are particularly suitable salts because they have a buffer action and thus control both the ionic strength and the hydrogen ion concentration. Citrates are especially advantageous for the precipitation of fibrinogen because they not only control the ionic strength and the hydrogen ion concentration, but also prevent the transformation of fibrinogen into fibrin. For the precipitation of fibrinogen the pH may initially be adjusted in the neighborhood of 6.0 to 7.8. An ionic strength of 0.05 is adequate for effecting electrical discharge and flocculation; higher ionic strengths (e. g., 0.15 or more) are sometimes desirable for increasing the buffering and the solubility.

Under these conditions fibrinogen is precipitated from the plasma.

If the remaining plasma is now cooled to $-5°$ C. and the alcohol concentration increased, for example to 25%, the pH remaining as before, gamma globulin will be precipitated. Alpha and beta globulins may be obtained by increasing the alcohol concentration to 40%, the temperature remaining at $-5°$ C. and the pH being adjusted to 5.5–6.0.

By lowering the temperature to $-15°$ C. and the pH to 4.7, the alcohol concentration remaining the same, the albumins are precipitated from the plasma.

Other precipitants and other procedures may be employed, as more fully set forth in a copending application of Edwin J. Cohn, Ser. No. 430,075, filed February 9, 1942.

As stated in said copending application, the conditions selected for the fractionation depend upon the solubilities of the various protein components of the system and are determined by the five variables: temperature, pH, ionic strength, concentration of precipitant and concentration of the protein components. The latter factor is of most importance when the concentration of the various proteins in the system is high and diminishes in importance in dilute protein solutions. These effects of protein concentration often protect labile proteins from denaturation. The other four variables are important under all conditions and must always be under control if reproducible separations are to be carried out in protein systems. In sufficiently dilute protein solutions they alone suffice to define the separations.

Other precipitants include the water-miscible alcohols, such as methanol, butanol, etc., and the water-miscible acetones.

The precipitant may be added to the protein solution by diffusion through a semi-permeable membrane (for example, Cellophane) or it may be added directly to said solution. Fibrinogen has been precipitated from plasma by spraying the plasma into ethanol-water mixtures, or vice versa. A flowing junction has also been employed for this addition, by supplying ethanol-water mixtures through one end of the top of a T-shaped tube, and plasma through the other end of the top, the two solutions being thoroughly mixed and passing together down the stem of the T.

In an alternate procedure, any desired protein, for example fibrinogen, may be obtained by extraction from a solid protein mixture. Thus such a mixture of proteins may be precipitated simultaneously, the mixture dried and then a desired protein extracted therefrom and later reprecipitated.

Using 25% ethanol at a temperature of −5° C., fibrinogen and globulin may be precipitated together and the protein product so obtained may be used in the manufacture of plastic compositions.

The precipitated proteins may be dried in various ways, as by freezing and evaporation of the frozen liquid from the precipitate, or by washing with alcohol or other highly volatile liquid miscible with water and evaporation at room temperature or lower, or, in the case of more stable proteins such as albumin, by passing dry gases over the wet precipitate, etc.

It is advantageous to obtain the proteins in an undenatured state and in the form of a light, fluffy powder which readily absorbs and retains liquid plasticizers.

For certain purposes fibrin may be used instead of fibrinogen in the manufacture of our novel plastics. Fibrin plastics tend to be tough and leathery when the proportion of plasticizer is low, and soft and weak when the proportion of plasticizer is high, but freezing the fibrin and drying it from the frozen state will adapt it to some plastic uses.

In the manufacture of our plastic materials, varying amounts of other proteins such as albumin or globulin are mixed with fibrinogen. For example, up to 75% of these other proteins may be added. The dry, finely-divided proteins are mixed with a liquid plasticizer, for example glycerol, in proportions which may be one part of fibrinogen to one-third to ten parts of plasticizer. Other compounding ingredients, such as fillers and/or anti-oxidants, may be added. The mixture is allowed to stand for two hours or longer and/or is milled on mixing rolls, forming a pasty mass which can be molded under pressure and cured by heat, for example at a temperature of 100° C. for fifteen to forty-five minutes.

Among the plasticizing agents which may be used are glycerol, ethylene glycol and other polyhydric alcohols.

Hygroscopic salts, such for example as sodium thiocyanate, sodium iodide or calcium or barium thiocyanate or iodide, may advantageously be mixed with the protein. Sodium thiocyanate, for example, makes the plastic product more firm and also more transparent and homogeneous.

The properties of the plastic may be varied by variation in the amount and character of the proteins which are added, the proportion of plasticizer, the time and temperature of heating and the presence of other ingredients. Larger amounts of albumins or globulins tend to produce a more rigid product. Higher temperatures and longer heating also tend to harden the product.

Protein plastics obtained in accordance with our invention are suitable for a variety of uses, such as in surgery and medicine. The protein when used in surgery tends to be absorbed by the animal body in time and this tendency is affected by the compounding procedure employed. For example, some plastics containing glycerol as the plasticizer tend to disappear in the body in a relatively shorter time than those in which the plasticizer is ethylene glycol.

The products and procedures disclosed above are by way of example only and various changes and modifications therein may obviously be made, in keeping with the spirit of the invention as defined in the appended claims.

We claim:

1. A process for the manufacture of a protein plastic which comprises as steps precipitating fibrinogen from blood plasma, drying the precipitated fibrinogen and mixing it while in a finely-divided condition with another protein selected from the group consisting of albumin and globulin and with a plasticizer, and setting the resulting mixture under heat and pressure.

2. The process for the manufacture of a plastic, said process comprising as steps, separating fibrinogen and other proteins from blood, then mixing the separated fibrinogen with at least one other protein selected from the group consisting of albumin and globulin, the fibrinogen being present in proportion substantially exceeding that in which it occurs in normal blood, and setting the mass to form a plastic.

3. In a process for the manufacture of plastics, the steps which comprise separating fibrinogen and other proteins from blood plasma, taking a mixture of fibrinogen and at least one other protein selected from the group consisting of albumin and globulin, the fibrinogen being present in amount exceeding that in which it occurs in normal blood, and shaping this mixture under the influence of heat and pressure.

EDWIN J. COHN.
JOHN D. FERRY.